United States Patent
Jain

(10) Patent No.: US 7,426,634 B2
(45) Date of Patent: Sep. 16, 2008

(54) METHOD AND APPARATUS FOR RATE BASED DENIAL OF SERVICE ATTACK DETECTION AND PREVENTION

(75) Inventor: Hemant Kumar Jain, Los Gatos, CA (US)

(73) Assignee: IntruGuard Devices, Inc., Sunnyvale, CA (US)

( * ) Notice: Subject to any disclaimer, the term of this patent is extended or adjusted under 35 U.S.C. 154(b) by 696 days.

(21) Appl. No.: 10/759,799

(22) Filed: Jan. 15, 2004

(65) Prior Publication Data

US 2004/0215976 A1  Oct. 28, 2004

Related U.S. Application Data

(60) Provisional application No. 60/464,769, filed on Apr. 22, 2003.

(51) Int. Cl.
*H04L 9/00* (2006.01)
(52) U.S. Cl. ............................ 713/151; 709/224
(58) Field of Classification Search ................ 713/151; 726/22, 23, 11, 12; 709/230, 231, 233, 235
See application file for complete search history.

(56) References Cited

U.S. PATENT DOCUMENTS

| | | | | |
|---|---|---|---|---|
| 5,805,801 | A * | 9/1998 | Holloway et al. | 726/22 |
| 5,919,257 | A | 7/1999 | Trostle | 713/200 |
| 5,931,946 | A | 8/1999 | Terada et al. | 713/201 |
| 5,991,881 | A | 11/1999 | Conklin et al. | 713/201 |
| 6,016,546 | A | 1/2000 | Kephart et al. | 713/200 |
| 6,088,804 | A | 7/2000 | Hill et al. | 713/201 |
| 6,115,680 | A * | 9/2000 | Coffee et al. | 702/187 |
| 6,279,113 | B1 | 8/2001 | Vaidya | 713/201 |
| 6,301,668 | B1 | 10/2001 | Gleichauf et al. | 713/201 |
| 6,321,338 | B1 | 11/2001 | Porras et al. | 713/201 |
| 6,408,297 | B1 * | 6/2002 | Ohashi | 707/10 |
| 6,934,850 | B2 * | 8/2005 | Sato | 713/189 |
| 2002/0032871 | A1 * | 3/2002 | Malan et al. | 713/201 |
| 2002/0035698 | A1 * | 3/2002 | Malan et al. | 713/201 |
| 2002/0083175 | A1 | 6/2002 | Afek et al. | 709/225 |

(Continued)

OTHER PUBLICATIONS

Connie Howard, "Security consideration at the data link layer: layer 2 the weakest link," Packet Magazine, fist Quarter 2003, pp. 30-33.

(Continued)

*Primary Examiner*—Kambiz Zand
*Assistant Examiner*—Dant B Shaifer Harriman
(74) *Attorney, Agent, or Firm*—Lumen Patent Firm, Inc.

(57) ABSTRACT

The present invention provides a method and apparatus for detecting and preventing a plurality of denial of service (DOS) and distributed denial of service (DDOS) attacks. The apparatus includes classifiers for parsing packets; meters storing statistics for the classified packets and detecting flood thresholds; an Ager for maintaining timeouts; a decision multiplexer for multiplexing inputs from various meters and determines whether to allow or deny the packet; and a threshold estimation means for estimating thresholds based on past data from meters, baselines, trends and seasonality. The apparatus includes a PCI interface through which a host can interact, learn continuously and set thresholds in a continuous and adaptive manner so as to prevent rate based DOS and DDOS attacks. The apparatus includes a mechanism to track culprit sources at layer 2 and layer 3 through a multiplicative increment method.

7 Claims, 12 Drawing Sheets

U.S. PATENT DOCUMENTS

2002/0101819 A1* 8/2002 Goldstone .................. 370/229
2002/0144156 A1* 10/2002 Copeland, III ............. 713/201
2003/0065943 A1 4/2003 Geis et al. .................. 713/201

OTHER PUBLICATIONS

Rocky K. C. Chang, "Defending against flooding-based distributed denial-of-service attacks: a tutorial," IEEE Communications Magazine, Oct. 2002, pp. 42-51.

David Moore et al., "Inferring internet denial—of—service activity," Proc. 10$^{th}$ USENIX Sec. Symp. 2001.

Rik Farrow, "VLANs: virtually insecure?" Network Magazine, Mar. 2003.

"NetScreen concepts and examples: screen OS reference guide, vol. 2: fundamentals P/N 09-0520-000 Rev F", pp. 34-44. Retrieved on Sep. 7, 2002. Retrieved from the internet: < URL: http://www.netscreen.com/support/downloads/CE-v2.pdf>.

Jeff Forristal, "Fireproofing against DoS attacks," Network Computing, Dec. 10, 2001. pp. 65-74.

Robert Beverly, "MS-SQL slammer/sapphire traffic analysis." Retrieved on Mar. 31, 2003. Retrieved from the internet: < URL: http://mmo.lcs.mit.edu/slammer/>.

Jake D. Brutlag, "Aberrant behavior detection in time series for network monitoring," presented at 2000 LISA XIV, Dec. 3-8, 2000, New Orleans, LA. <Retrieved from the internet: < URL: www.usenix.org/events/lisa2000/full_papers/brutlag/brutlag_html/>.

Stephen R. Lawrence, "Demand forecasting, time series models." Retrieved on Sep. 8, 2003. Retrieved from the internet: < URL: http://www.-bus.colorado.edu/faculty/lawrence/tools/FORECAST/forecast.ppt>.

* cited by examiner

METHOD AND APPARATUS FOR RATE BASED DENIAL OF SERVICE ATTACK DETECTION AND PREVENTION

CROSS-REFERENCE TO RELATED APPLICATIONS

This application claims priority from a provisional patent application No. 60/464,769, filed Apr. 22, 2003, the entire content of which is incorporated herein by reference.

FIELD OF THE INVENTION

The present invention relates to the detection and prevention of rate based denial of service (DOS) and distributed denial of service (DDOS) attacks on a network node or a segment.

DESCRIPTION OF THE BACKGROUND ART

There exist two principal categories of denial of service attacks: logic attacks and flooding or rate-based attacks. Logic attacks exploit existing software flaws to crash or degrade performance. Rate-based attacks on the other hand, overwhelm the victim's CPU, memory, or network resources with a large number of spurious or crafted packets. These packets are either targeted to the victim or sent from the victim.

Routers and switches can perform some filtering functions to provide a certain level of protection. Such protection, however, is very coarse-grained, inflexible, and slow. To date, routers and switches cannot effectively limit traffic on a per-host or per-application basis. On the other hand, firewalls can filter in a sophisticated way, but since they need to perform additional analyses not specific to DOS protection, their performance is also limited.

To protect critical network servers or network segments from such attacks, solutions are available in the market with expensive intrusion prevention systems. Unfortunately, denial-of-service (DOS) and distributed denial-of-service (DDOS) attacks continue to incapacitate sites or network nodes not secured by these expensive intrusion prevention systems. Existing intrusion prevention systems suffer from false positives due to the use of attack signatures. In addition, to adopt a rate based approach, these systems would need provisioning for various thresholds of DOS attacks. This provisioning requires estimating rates for a number of thresholds, which could be a daunting task.

Therefore, there is a need and desire in the art for a viable and effective mechanism that identifies, detects, and prevents rate based attacks in various layers of network traffic. Such a mechanism must be able to separate legitimate traffic from spoofed traffic, must be able to identify culprits who are generating such rate based attacks, and must be able to block those attacks. It is particularly desirable that such a mechanism can prevent a network node from getting attacked or attacking others in the network in case it is infected. It is also desirable that the mechanism estimates the thresholds in a continuous and adaptive way, i.e., estimated based on past traffic during normal times, so that the user does not have to provision them.

SUMMARY OF THE INVENTION

The present invention addresses the above-mentioned needs and desires with a new and inventive method and apparatus capable of identifying, detecting, and preventing a plurality of rate-based denial of service (DOS) attacks. In some embodiment, the apparatus comprises a media access controller (MAC) device, a Physical Layer (PHY) device, a classifier, a meter, a dropper and a Peripheral Components Interconnect (PCI) interface to allow control through a host that supports PCI interface. MAC, PHY, PCI and other known terms referenced below are familiar to those of ordinary skill in the computer art and thus are not further described herein.

The classifier includes: parsers for Ethernet frames, Internet Protocol Version 4 (IPV4) and Version 6 (IPV6) packets, and Transmission Control Protocol (TCP), User Datagram Protocol (UDP), Internet Control and Message Protocol (ICMP) headers. The meter collects the statistics so that flood detection is possible and the dropper allows for certain network frames to be dropped if a flood has been detected for the type of frames. The types of flood that can be detected and prevented with the present invention include, but not limited to Layer 2 floods, Layer 3 floods, and Layer 4 floods.

Layer 2 floods include Broadcast Flood, Address Resolution Protocol (ARP) Flood, Reverse ARP (RARP) Flood, Multicast Flood, Virtual Local Area Network (VLAN) Flood, and Double Encapsulated VLAN Flood. Layer 3 floods include Protocol Flood, IP Option Flood, and Fragment Flood. Layer 4 floods include Port Flood, ICMP Type/Code Floods. With the present invention, attacks due to wrong header values in Layer 2, Layer 3 and Layer 4 headers can also be detected and prevented. Other attacks such as Port Scans can also be detected.

The present invention advantageously provides a method of detecting legitimate IP addresses in case of a synchronization (SYN) flood attack so that during the SYN flood only legitimate IP addresses will be provided with connections and the rest will be rejected.

The present invention provides a method and software implementing the method for estimating various thresholds based on past traffic in an adaptive and continuous way to further enable and enhance detection and prevention of rate-based floods. To enable this feature, a continuous learning method is provided. More specifically, the software according to the present invention has an ability to continuously learn the baseline traffic through the apparatus with various network characteristics.

An object of the present invention is to provide an apparatus capable of detecting and preventing a plurality of rate-based and non-rate based DOS and DDOS attacks, the apparatus comprising:

a set of MAC and PHY chips which interface with the network, the MAC provides a first-in-first-out (FIFO) interface capable of transmitting and receiving network packets;

a MAC interface with a packet buffer capable of buffering packets for inspection before they are transmitted to the classifying means and capable of dropping packets marked for dropping by meters;

a classification means capable of performing Layers 2, 3 and 4 classification, the classification means being capable of enforcing Layer 2, 3 and 4 accepted header syntax and detecting and preventing global threshold based attacks;

a meter means capable of utilizing data from Layers 2, 3 and 4 classification and capable of maintaining statistics for rate based attacks, such as SYN Flood, Port Scan, Source Floods, Destination Floods, Port Flood, ICMP Type/Code Floods;

an ager means capable of timing out flood states marked by the metering means; and a threshold estimation means capable of estimating thresholds based on past data from meters, their baseline, trends and seasonality.

In some embodiments, the apparatus further comprises means for detecting and preventing rate based attacks such as SYN Flood, IP protocol floods, Port Scan, Destination Scan, etc., either to an end node to which the apparatus is connected or from the end node to other nodes on the Internet. The SYN Flood Prevention and Detection mechanism comprises support for creation of a plurality of legitimate IP addresses during normal operation when the TCP state transitions to "established" the first time.

Further, the SYN Flood Prevention and Detection mechanism comprises means for allowing traffic, during normal operation, only the plurality of legitimate IP addresses stored, thereby limiting the attack.

Further, the Zombie TCP Attack Detection and Prevention mechanism comprises means for limiting TCP traffic by legitimate IP addresses based on thresholds set during normal times.

Further, the Source Tracking and Prevention mechanism comprises means for identifying sources that are attacking the victim node. The Source Tracking mechanism comprises means for identifying attackers at layers 2, 3 and 4.

Further, the Destination Tracking and Prevention mechanism comprises means for identifying destinations that are being attacked by the culprits.

Further, the Flood Prevention mechanism works in such a way as to block only specific activity. For example, if the attack is from a specific IP address, packets from only that IP Address are blocked. Similarly, if the attack is on a specific TCP or UDP port, only that port is blocked.

In cases where the method and apparatus of the present invention is embodied or otherwise implemented in an appliance, the present invention provides corresponding software driver for setting appropriate thresholds based on past traffic, trend and seasonality.

DETAILED DESCRIPTION

Figure 1:
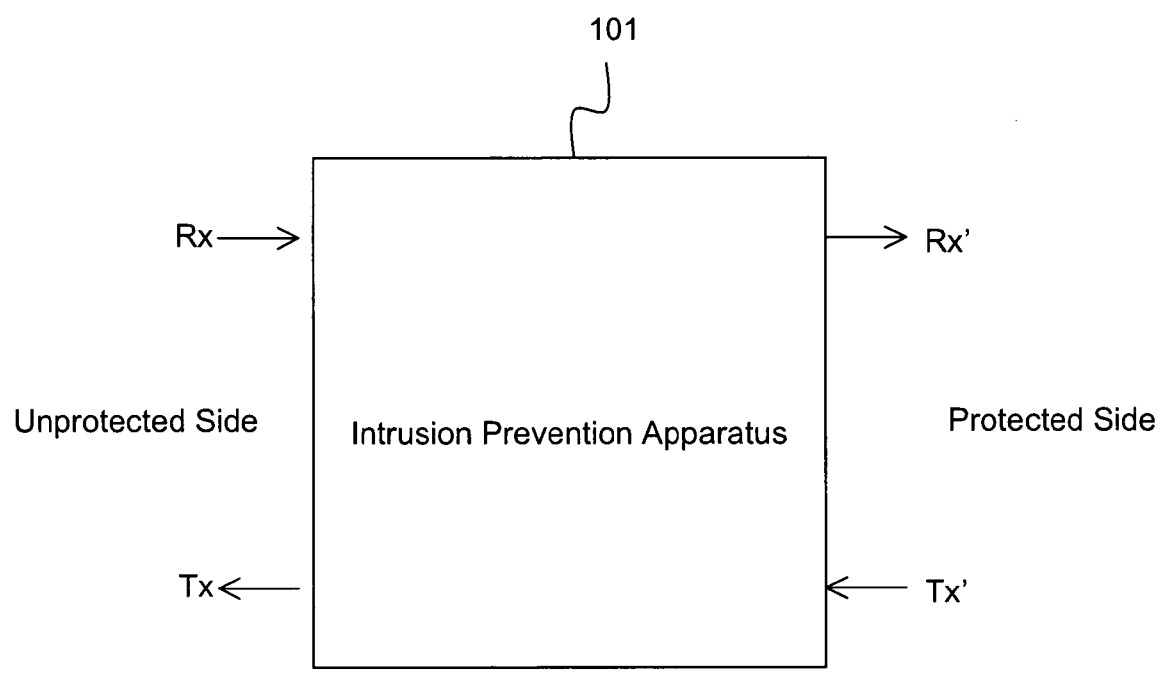
FIG. 1 illustrates an exemplary apparatus embodying the present invention.

In FIG. 1, shows a high level diagram of an appliance 100 implementing the present invention. The apparatus 101 has a receive port Rx and a transmit port Tx connected to the unprotected side of the network. It has a receive port Rx' and a transmit port Tx' on the protected side. The apparatus 101 controls the traffic received on Rx and provides a controlled Rx' . Similarly, when the protected side wants to transmit traffic Tx', it must be controlled and sent out as Tx.

Figure 2:
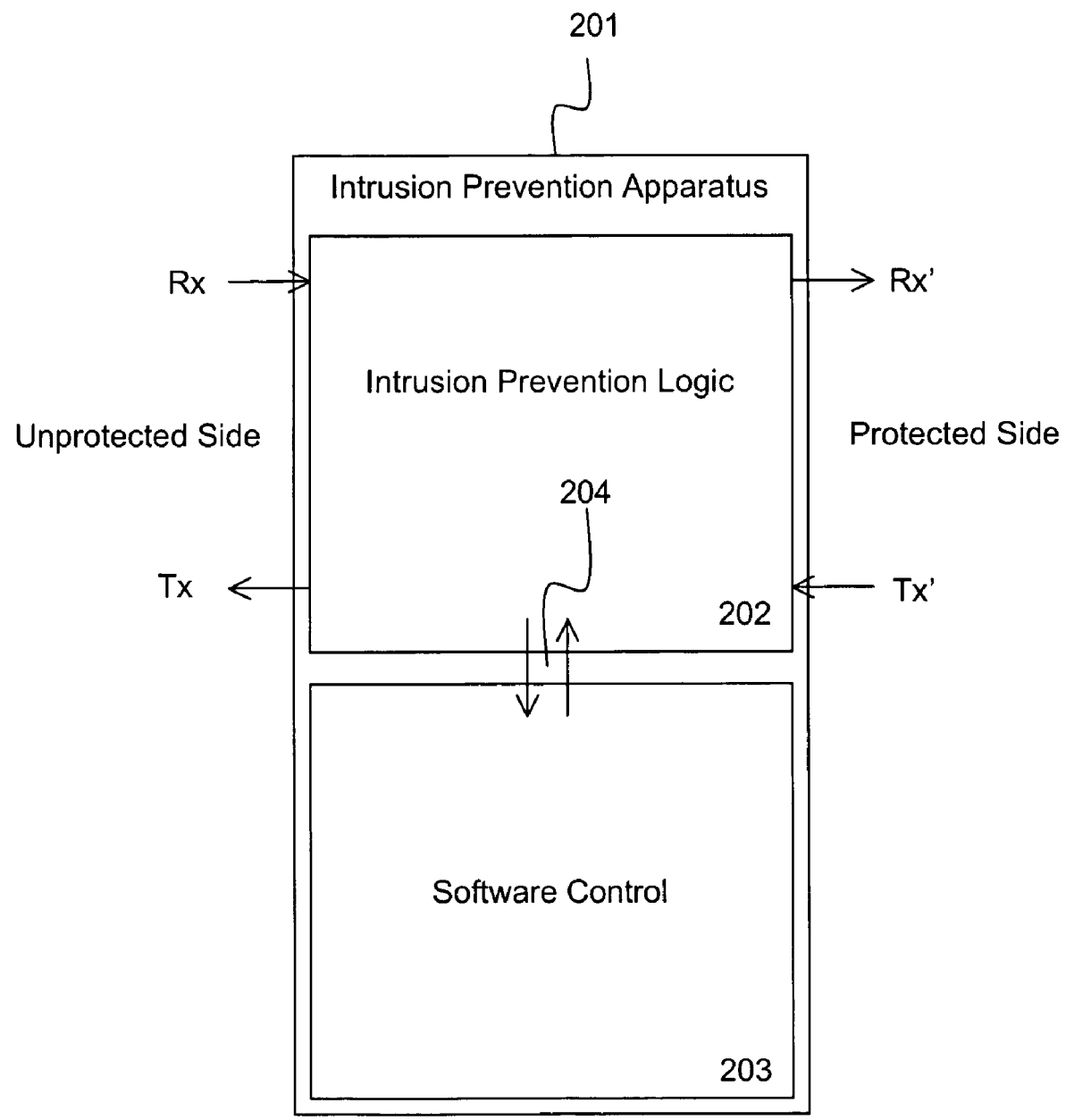
FIG. 2 illustrates a second level detail of the exemplary apparatus embodying the present invention.

FIG. 2 illustrates the appliance 100 of FIG. 1 in further detail. The apparatus 201 contains a host based Software Control 203 that controls the parameters of the Intrusion Prevention Logic 202. The parameters include items such as thresholds and timeouts which control the behavior of the Intrusion Prevention Logic 202. Software control is done using an interface such as PCI Interface 204 which allows two way exchange of control information between the controlling host and the Intrusion Prevention Logic 202.

Figure 3:
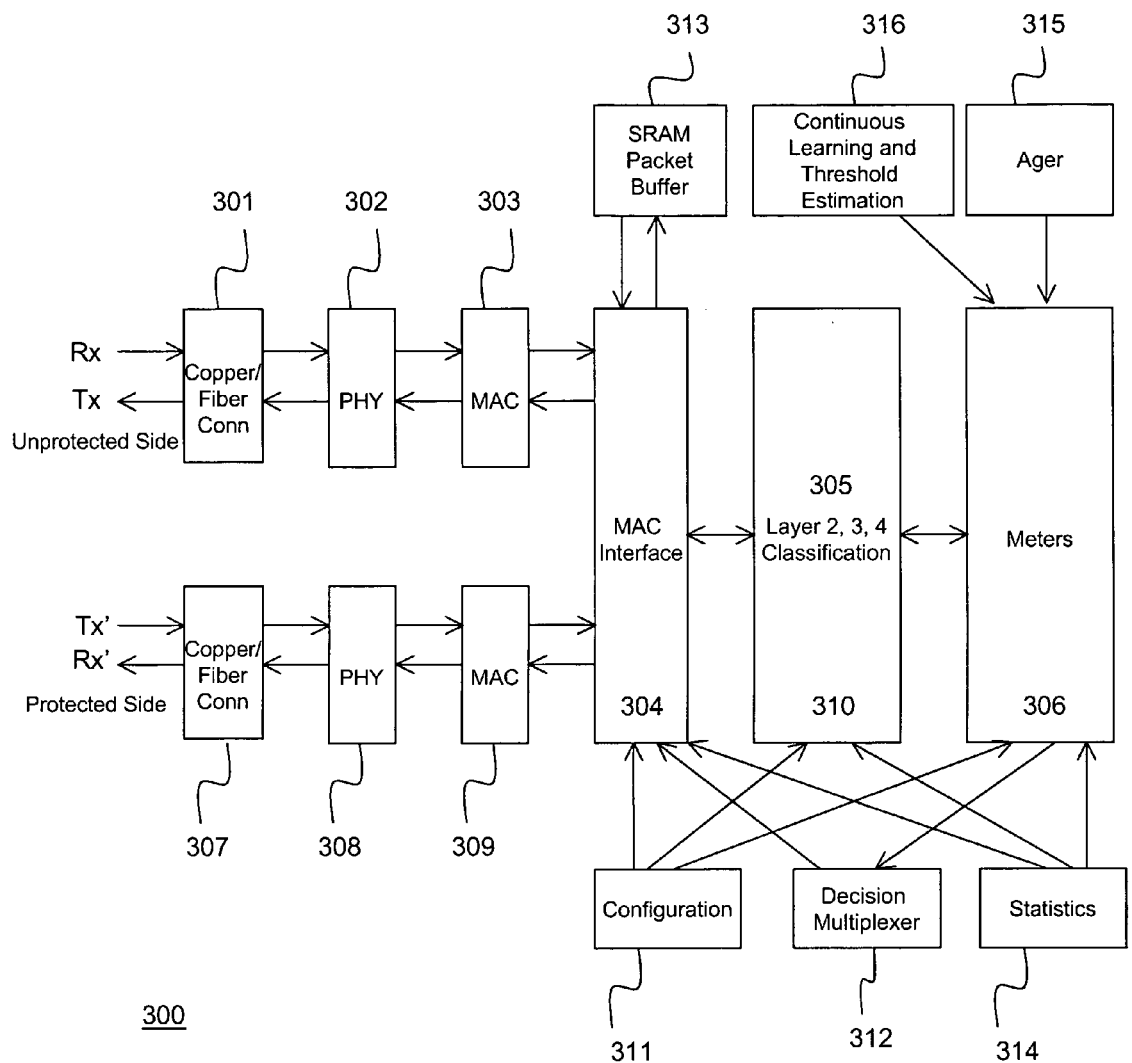
FIG. 3 schematically illustrates the rate-based attack detection and prevention logic of FIG. 2.

FIG. 3 further illustrates FIG. 2 in detail. Connector 301 provides physical network connectivity either for copper or optical medium. PHY device 302 provides the physical layer interface and interfaces with the connector 301 on one side and the MAC Layer device 303 on the other. The MAC device 303 receives signals such as GMII from the PHY and provides a FIFO interface to the MAC Interface device 304. In a similar way, devices 307, 308 and 309 connect protected side to the MAC Interface 304.

Upon receiving a packet Rx from unprotected side or Tx' from protected side, the MAC Interface device 304 buffers the packet in an SRAM Packet Buffer 313. Once a packet is fully available from either interface, the MAC Interface provides that packet to the Classifier block 310 comprising Layer 2, 3, 4 Classification Logic 305. The Classifier 310 parses each packet as it is received from the MAC Interface 304. Depending on the type of packet, it isolates various header values and does hierarchical protocol classification until layer 4.

In the mean time if a packet starts appearing on the other interface, it is buffered in the Packet Buffer 313. After sending a packet from an interface to the Classifier 310, the MAC Interface Logic 304 switches to the packet from the other interface, if available, and starts transmitting that packet to the Classification Logic 305. This ensures that both interfaces get equal opportunity in servicing packets.

The Classification Logic 305 analyzes the Layer 2, 3, and 4 headers of the incoming packet and provides that information to the Meters 306.

The Meters block 306 receives classified headers from the Classification Logic 305 and determines whether a packet should be dropped. That is, the Meters block 306 uses the isolated header values from the Classifier block 310 to increment memory values corresponding to various types of floods. It also checks whether any of the thresholds have been reached. If so, it updates the flood states. Depending on the state and the incoming packets header value, it lets the Decision Multiplexer 312 know if the packet needs to be dropped. It informs the Control and Statistics Block 314 if a packet is being dropped so that the discard statistics can be updated.

Since the Meters block 306 consists of many meters, some of them may give positive decision while others may give a negative decision on dropping, a Decision Multiplexer 312 combines all decisions and comes up with a single decision for the MAC Interface 304, i.e., to drop or allow the packet to proceed. If the packet is to be dropped, it is removed from the Packet Buffer 313 and not transmitted. If the packet is allowed, it is removed and transmitted to the appropriate interface.

The Configuration block 311 interfaces with the host CPU and allows the host attached therewith to configure the functionality of the apparatus. It receives the threshold values for various floods from a host based driver.

The Statistics block 314 stores the statistics which can be read by the host. It keeps statistics on various floods so that the host can take a peek at the traffic behavior. It gets and/or updates the statistics per information received or otherwise obtained from the Classifiers block 310 and the Meters block 306.

The Ager block 315 wakes up after a certain pre-set time and finds floods which have aged and unblocks those. This allows traffic to come to normal after pre-set timeouts.

The Continuous Learning and Threshold Estimation block 316 interfaces with the Software Control 203. It helps the host software to learn the baseline traffic and to determine the thresholds based on the past traffic, trend and seasonality.

Figure 4:
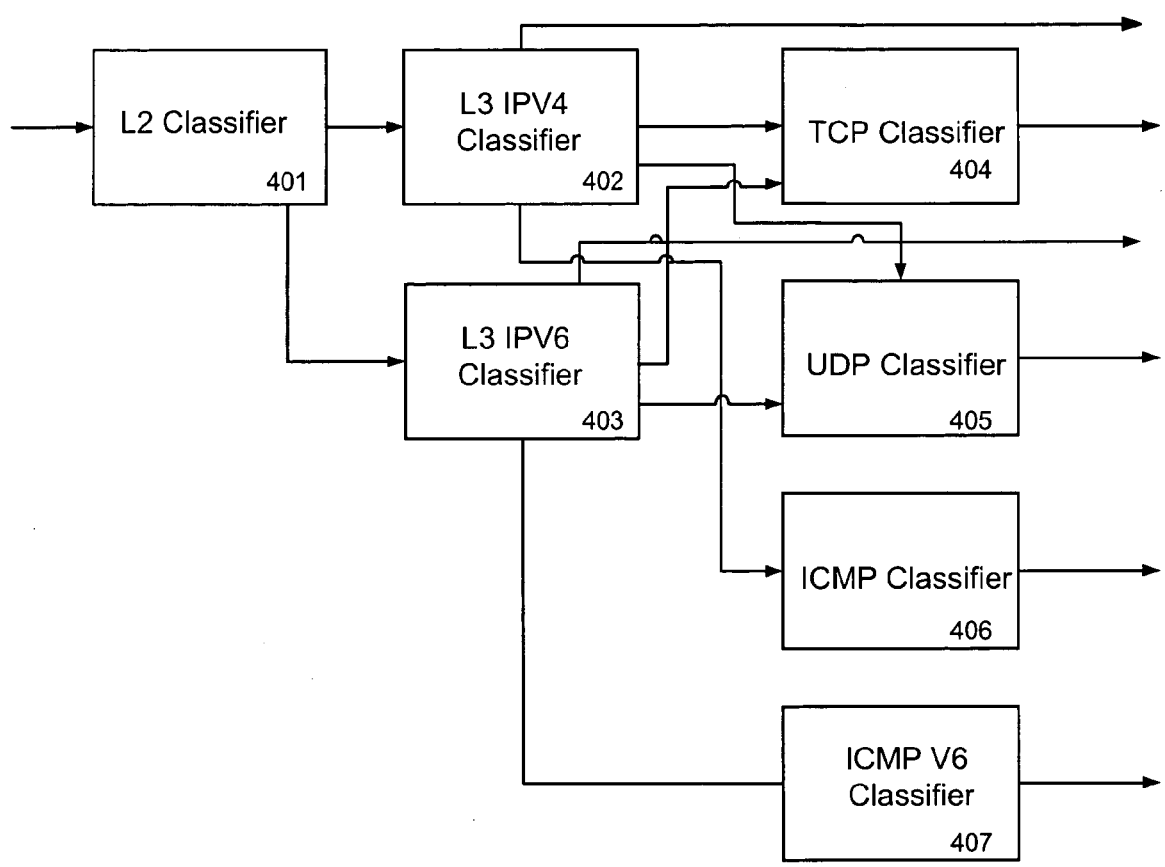
FIG. 4 shows an example of the Classifiers of FIG. 3.

As FIG. 4 illustrates, the Classification Logic 305 of FIG. 3 may include a Layer 2 (L2) Classifier 401, a Layer 3 (L3) IPV4 Classifier 402, a L3 IPV6 Classifier 403, a Layer 4 (L4) TCP Classifier 404, a UDP Classifier 405, an ICMP Classifier 406 and an ICMP V6 Classifier 407.

L2 Classifier 401: This block parses Layer 2 frames according to the Ethernet-II and IEEE 802.3/802.2 standards known in the art. It is possible, however, to include other classifiers to support other types of frames.

In an embodiment of this invention, the L2 Classifier 401 determines the byte position where the Layer 3 header begins and whether it is IPV4 or IPV6 or yet another type of Layer 3 frame termed as non-IP frame. In addition, it determines whether this is a broadcast frame, multicast frame, VLAN tagged frame, or a double encapsulated VLAN frame. It also determines whether this frame is an ARP frame or RARP frame.

L3 IPV4 Classifier 402: This block determines the byte position where the Layer 4 header begins and whether it is TCP, UDP, ICMPV4, or yet another type of Layer 4 packet termed as generic IP packet. In addition, the L3 IPV4 Classifier 402 determines the source IP address, the destination IP address, and whether this is a fragmented packet.

Additionally, the L3 IPV4 Classifier 402 determines anomalous behavior, e.g., whether the IP Checksum of the header is correct, if it is a received frame. If it is incorrect, the L3 IPV4 Classifier 402 requests that this packet be discarded. In addition, if the packet is from a local host address, the L3 IPV4 Classifier 402 requests that this packet be discarded. If the source address of the packet is the same as the destination address, the L3 IPV4 Classifier 402 also requests that this packet be discarded.

L3 IPV6 Classifier 403: This block determines the byte position where the Layer 4 header for TCP, UDP or ICMPV6, begins. In addition, the L3 IPV6 Classifier 403 determines the source IP address, the destination IP address, and whether this is a fragmented packet.

The L3 IPV6 Classifier 403 determines certain anomalies, e.g., if the packet is from local host address, the L3 IPV6 Classifier 403 requests that this packet be discarded. If the source address of the packet is the same as the destination address, the L3 IPV6 Classifier 403 requests that this packet be discarded.

L4 Classifier 404: Once the L3 IPV4 Classifier 402 and the L3 IPV6 Classifier 403 determine that the packet is a TCP packet, it is parsed by the TCP Classifier 404. The L4 TCP Classifier 404 isolates the source port and the destination port of the packet. In addition, it isolates the TCP flags.

The L4 TCP Classifier 404 determines certain anomalies, e.g., whether the packet flags are incorrect such as no bits set, SYN and FIN bits set, FIN with no ACK bit, etc. If such conditions exist, the L4 TCP Classifier 404 requests that this packet be discarded. If the TCP header checksum does not match the calculated checksum, the L4 TCP Classifier 404 also requests that this packet be discarded.

L4 UDP Classifier 405: Once the L3 IPV4 Classifier 402 and the L3 IPV6 Classifier 403 determine that the packet is a UDP packet, it is parsed by the L4 UDP Classifier 405. The L4 UDP Classifier 405 isolates the source port and the destination port of the packet.

In some embodiments, the L4 UDP Classifier 405 determines whether the UDP header checksum matches the calculated checksum. If not, the L4 UDP Classifier 405 requests that this packet be discarded.

L4 ICMP Classifier 406: Once the L3 IPV4 Classifier 402 determines that the packet is an ICMPV4 packet, it is parsed by the L4 ICMP Classifier 406. The L4 ICMP Classifier 406 determines whether the ICMP header checksum matches the calculated checksum. If not, it requests that this packet be discarded.

L4 ICMP V6 Classifier 407: Once the L3 IPV6 Classifier 403 determines that the packet is an ICMPV6 packet, it is parsed by the L4 ICMPV6 Classifier 407. The L4 ICMPV6 Classifier 407 determines whether the ICMP header checksum matches the calculated checksum. If not, the L4 ICMPV6 Classifier 407 requests that this packet be discarded.

Figure 5:
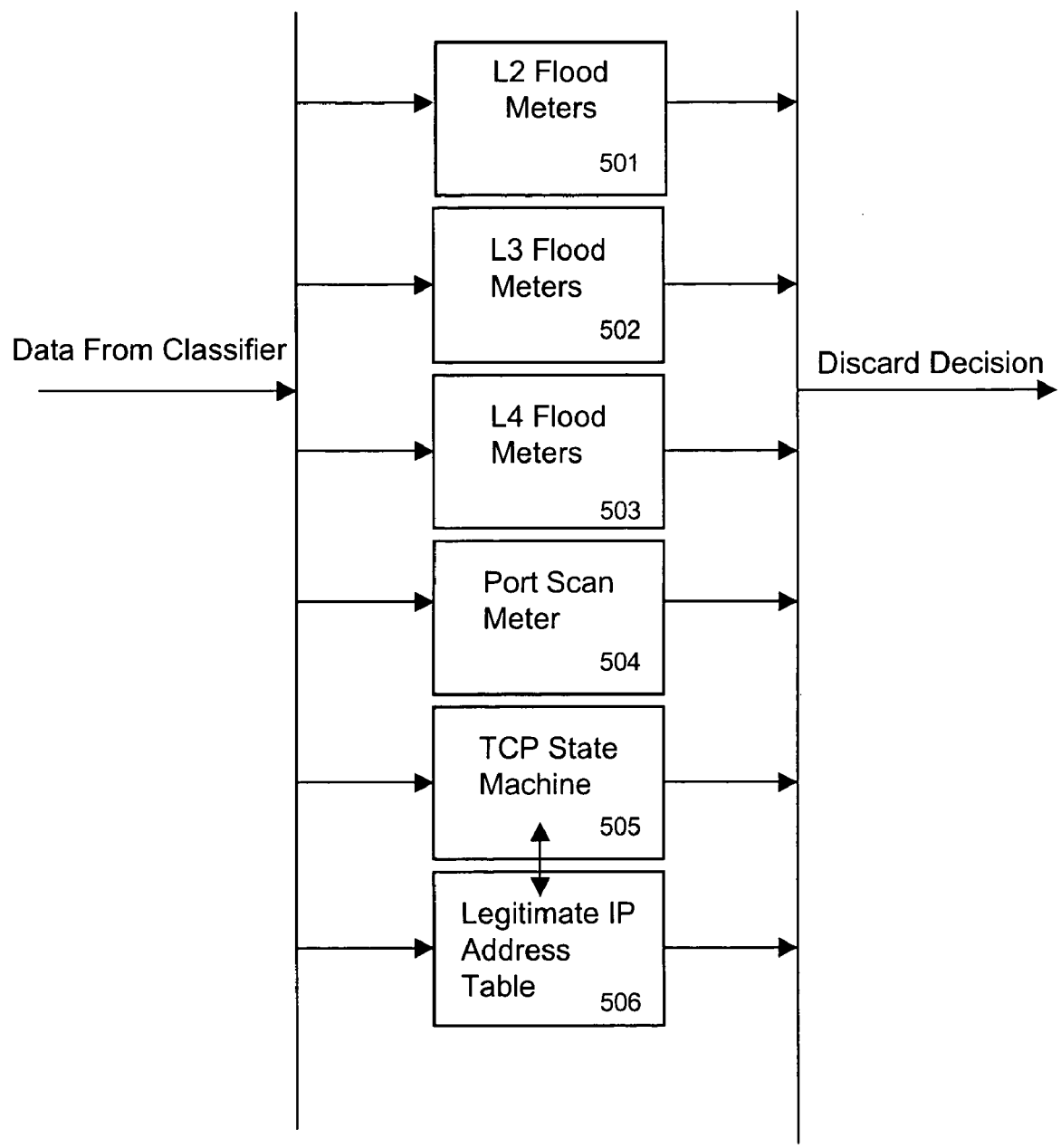
FIG. 5 shows an example of the Meters of FIG. 3.

FIG. 5 depicts the details of the Meter block 306 of FIG. 3. In some embodiments, the Meters block 306 comprises flood meters 501, 502, and 503 for detecting and preventing floods at Layer 2, Layer 3, and Layer 4. The Meters block 306 also includes the Port Scan Meter 504 for preventing port scan attacks; the TCP State Machine 505 for maintaining the TCP state transitions of the TCP connections; and the Legitimate IP Address Table 506 for maintaining a list of addresses which have so far established valid TCP connections.

L2 Flood Meter 501: This block receives data from Layer 2 classifier and, depending on the Layer 2 characteristics, it increments the thresholds for various types of frames isolated. If a preset threshold has been reached, the L2 Flood Meters 501 changes the state of that particular type of frames to blocked state for a certain predetermined time period.

In an embodiment of this invention, the L2 Flood Meters 501 can detect and prevent the following Layer 2 DOS attacks:

ARP and RARP Floods,
Broadcast and Multicast Floods,
VLAN and Double Encapsulated VLAN Floods, and
Non-IP floods.

As one of ordinary skill in the art will appreciate, it is possible to implement the present invention for detecting and preventing other similar types of attacks at Layer 2.

L3 Flood Meters 502: This block receives data from Layer 3 classifier and, depending on the Layer 3 characteristics, it increments the thresholds for various types of packets isolated. If a preset threshold has been reached, the L3 Meter 502 changes the state of that particular type of frames to blocked state for a certain predetermined time period.

In an embodiment of this invention, the L3 Flood Meters 502 can detect and prevent the following Layer 3 DOS attacks:

Fragment Floods,
IP Option Floods,
Protocol Floods,
Source Floods, and
Destination floods.

L4 Flood Meters 503: This block receives data from Layer 4 classifier and, depending on the Layer 4 characteristics, it increments the thresholds for various types of packets isolated. If a preset threshold has been reached, the L4 Flood Meters 503 changes the state of that particular type of frames to blocked state for a certain predetermined time period.

In an embodiment of this invention, the L4 Flood Meters 503 can detect and prevent the following Layer 4 DOS attacks:

TCP/UDP Port Floods,
ICMP Type/Code Floods,
SYN Floods, and
TCP Option floods.

Port Scan Meter 504: This meter monitors traffic from a single source. The traffic could be IPV4 or IPV6. A threshold exists for traffic to number of ports seen per second. Any time the traffic exceeds the threshold of a user-defined number of ports during a given one second period, traffic from source is blocked in that direction for a certain preset time period. After this time period, the traffic is unblocked and allowed to return to normal.

The Port Scan Meter 504 stores statistics related to traffic to ports on the node or to outside destinations in a table having columns similar to Table 1 below.

TABLE 1

Port Scan Table

| Name | Purpose |
| --- | --- |
| Used | 0: entry can be used for tracking new address<br>1: Occupied |
| IP Address | Source IP Address |
| Count | Current count of ports from this IP Address in this time period |
| Blocked State | 0: Do not block packets from this IP Address<br>1: block packets from this IP Address<br>Set when the Count reaches 10<br>Reset when the timeout is reached |
| Blocked Timeout | Timeout set when the state changed to Blocked<br>Timeout decremented by Ager every period<br>Upon reaching 0, Blocked state is reset |
| Port0:Port9 | Different Ports to which the IP Address has sent packets to in this time period. |
| Collision Pointer | Points to next entry to be created due to collision of the same address in memory due to hashing |

The Port Scan Meter 504 adds rows to the table using a hashing scheme. If the IP address is already present, the port is added if not already present. If the IP address is already present and the state in that direction is blocked, the packet is requested to be dropped. If the IP address is already present and the count reaches the preset threshold value, the state is changed to blocked state for a preset timeout value. After the timeout value, the state is reset to normal, i.e., unblocked state.

TCP State machine 505: This block monitors the TCP state transitions for all TCP traffic. In some embodiments, the TCP State machine 505 requests packets to be dropped if they present invalid TCP state transitions. This block also determines the direction of packet with respect to the direction of connection. This information can be used by the meters such as Port Flood Meters 801, and 802 to accurately determine the destination port for a packet.

Legitimate IP Address Table Block 506: The TCP state machine 505 adds the source IP address or destination IP Addresses to a legitimate IP Address table in memory any time the state transitions to ESTABLISHED state first time. If the packet is a SYN packet, and the state determined by the TCP SYN Flood Meter 804 (described later with referece to FIG. 8) is SYN Flood, then connection is only allowed if the source or the destination IP address is found in the Legitimate IP Address table. All other SYN packets are requested to be dropped. The Legitimate IP Address Table Block 506 adds rows to the table using a hashing scheme. If the IP address is already present, it is not added.

TABLE 2

Legitimate IP Address Table

| Name | Purpose |
| --- | --- |
| Used | 0: entry can be used for tracking new address<br>1: Occupied |
| IP Address | Source IP Address |
| Collision Pointer | Points to next entry to be created due to collision of the same address in memory due to hashing |

To avoid being flooded by zombies, which are legitimate IP addresses, this block maintains a count of allowed addresses in a second even during the SYN flood state. If the count exceeds the threshold, the block stops allowing new connections for a preset timeout period. This ensures that zombies with legitimate IP addresses do not flood the protected network with new connections.

Figure 6:
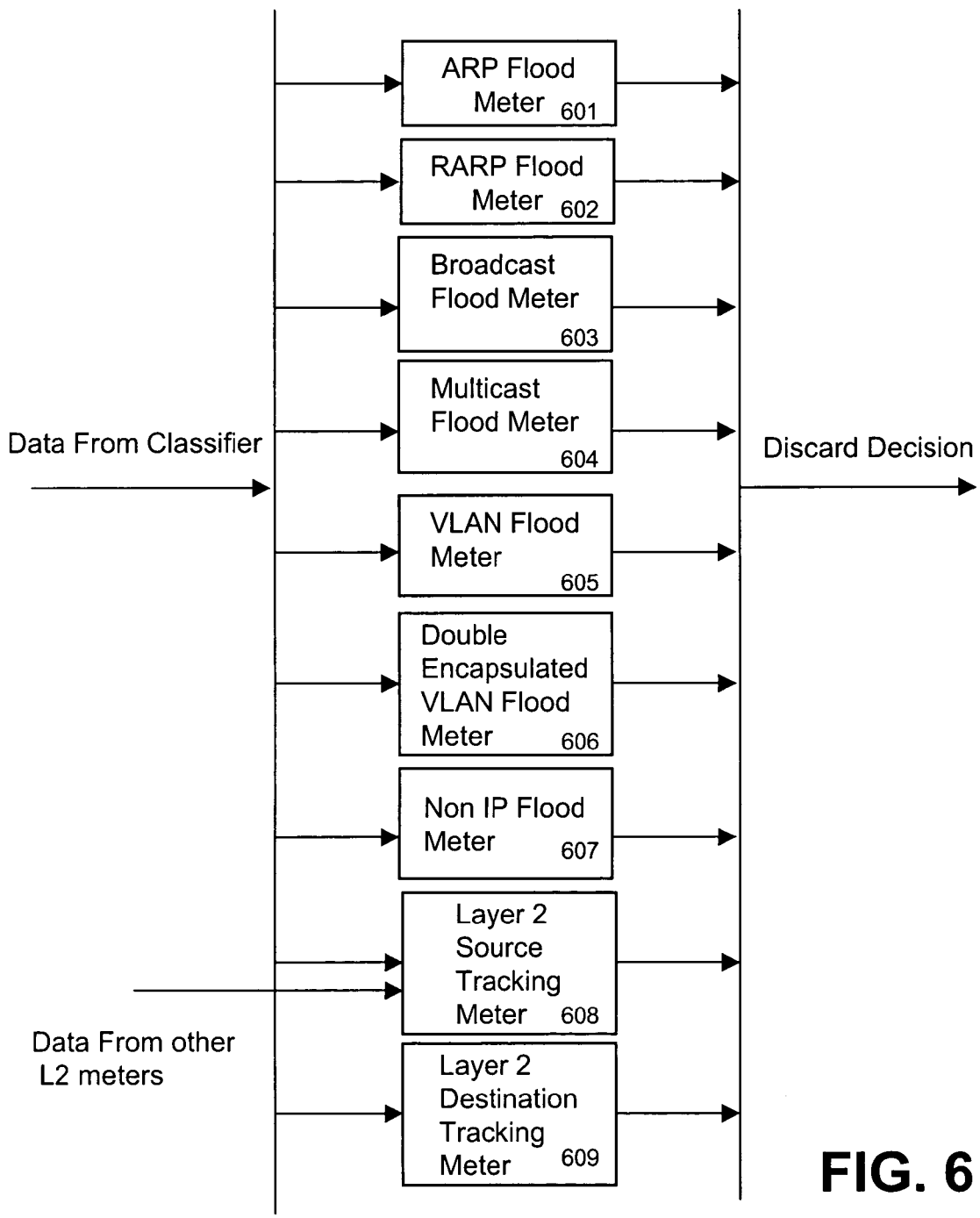
FIG. 6 shows an example of the Layer 2 Flood Meters of FIG. 5.

FIG. 6 depicts the details of the Layer 2 Flood Meters 501 of FIG. 5. As described below, the L2 Flood Meters block 501 comprises meters to detect and prevent ARP, RARP, VLAN, Double Encapsulated VLAN, Broadcast, Multicast, and Non-IP floods.

ARP Flood Meter 601: This block receives data from Layer 2 classifier and, if the packet is an ARP packet, it increments the count for ARP packet in that particular direction. If the count for ARP packets in that direction reaches a preset threshold, the ARP Flood Meter 601 changes the state of ARP packets to blocked state in that direction for a certain predetermined time period.

RARP Flood Meter 602: This block receives data from Layer 2 classifier and, if the packet is a RARP packet, it increments the count for RARP packet in that particular direction. If the count for RARP packets in that direction reaches a preset thresholds, the RARP Flood Meter 602 changes the state of RARP packets to blocked state in that direction for a certain predetermined time period.

Broadcast Meter 603: This block receives data from Layer 2 classifier and, if the packet is a Broadcast packet, it increments the count for Broadcast packet in that particular direction. If the count for Broadcast packets in that direction reaches a preset thresholds, the Broadcast Flood Meter 603 changes the state of Broadcast packets to blocked state in that direction for a certain predetermined time period.

Multicast Flood Meter 604: This block receives data from Layer 2 classifier and, if the packet is a Multicast packet, it increments the count for Multicast packet in that particular direction. If the count for Multicast packets in that direction reaches a preset thresholds, the Multicast Flood Meter 604 changes the state of Multicast packets to blocked state in that direction for a certain predetermined time period.

VLAN Flood Meter 605 and Double Encapsulated VLAN Flood Meter 606: These blocks receive data from Layer 2 classifier and, if the packet is a VLAN packet or a Double Encapsulated VLAN packet, they increment the count for these packets in that particular direction. If the count for these packets in that direction reaches a preset threshold, the meters change the state of such packets to blocked state in that direction for a certain predetermined time period.

Non-IP Flood Meter 607: This block receives data from Layer 2 classifier and, if the packet is a non-IP packet, it increments the count for non-IP packet in that particular direction. If the count for non-IP packets in that direction reaches a preset threshold, the Non-IP Flood Meter 607 changes the state of non-IP packets to blocked state in that direction for a certain predetermined time period.

Layer 2 Source Tracking Meter 608: This block receives data from Layer 2 classifier and increments the count for source MAC address of the packet. If the count for that MAC Address reaches a preset threshold, the Layer 2 Source Tracking Meter 608 changes the state of that source MAC Address to blocked state for a certain predetermined time period.

In addition, to track culprit sources, the Layer 2 Source Tracking Meter 608 receives input from other Layer 2 flood meters. Whenever a packet arrives and it meets a blocked state criteria by these meters, they inform the Source Tracking Meter 608. The Source Tracking Meter 608 then increments the count for that particular source MAC address by manifold. This makes the culprit source reaching the threshold faster than non-culprit MAC addresses.

Layer 2 Destination Tracking Meter 609: To identify victim destinations, this meter increments count for a destination MAC addresses each time a packet is received for the destination. If the count for that MAC Address reaches a preset threshold, the Layer 2 Destination Tracking Meter 609 changes the state of that destination MAC Address to blocked state for a certain predetermined time period.

Figure 7:
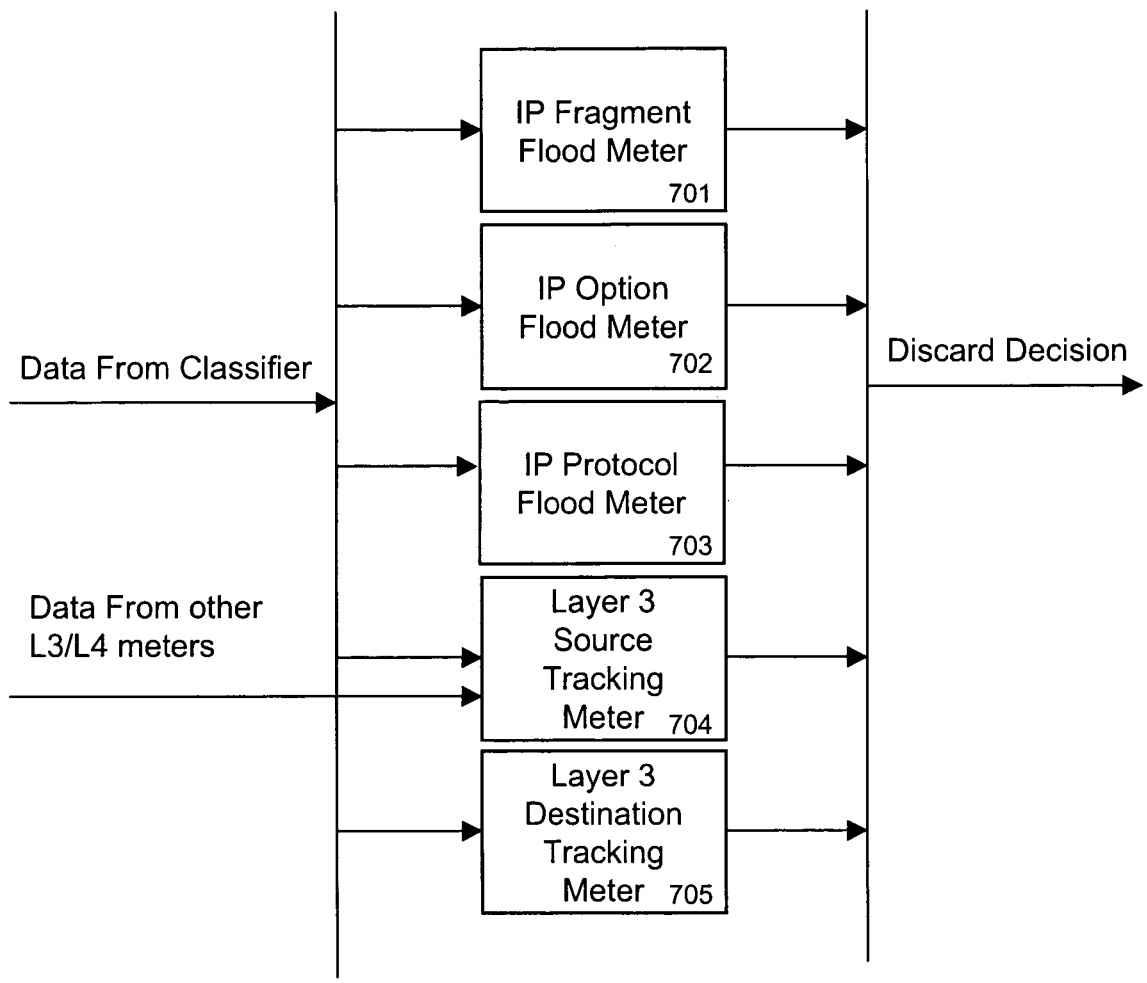
FIG. 7 shows an example of the Layer 3 Flood Meters of FIG. 5.

FIG. 7 depicts the details of the Layer 3 Flood Meters 502 of FIG. 5. The Layer 3 Flood Meters block 502 comprises meters to detect and prevent IP Fragment Floods, IP Options Floods, IP Protocol Floods, IP Source Floods and IP Destination Floods.

IP Fragment Flood Meter 701: This block receives data from Layer 3 IPV4 Classifier 402 and IPV6 Classifier 403. If the packet is a fragmented packet, it increments the count for fragmented packet in that particular direction. If the count for fragmented packets in that direction reaches a preset threshold, the Fragment Flood Meter 701 changes the state of fragmented packets to blocked state in that direction for a certain predetermined time period. Table 3 depicts an exemplary table used for storing the IP Fragment flood information.

TABLE 3

IP Fragment Flood Meter Table

| Field | Description |
| --- | --- |
| Fragment Count Forward | Current count of fragmented packets to this IP address |
| Fragment Blocked Forward | Current Blocked state of fragmented packets to this IP address |
| Fragment Timeout Forward | Timeout of Current Blocked state of fragmented packets to this IP address |
| Fragment Count Reverse | Current count of fragmented packets from this IP address |
| Fragment Blocked Reverse | Current Blocked state of packets from this IP address |
| Fragment Timeout Reverse | Timeout of Current Blocked state of fragmented packets from this IP address |

IP Option Flood Meter 702: This block receives data from Layer 3 IPV4 Classifier 402 and IPV6 Classifier 403. If the packet has IPV4 or IPV6 options, it increments the count for that IP option in that particular direction. If the count for a certain option type in that direction reaches a preset threshold, the IP Option Flood Meter 702 changes the state of that IP option type to blocked state in that direction for a certain predetermined time period. Any packet containing that particular IP option is blocked for that time period.

IP Protocol Flood Meter 703: Internet Protocol standard allows up to 255 protocols. This block receives data from Layer 3 IPV4 Classifier 402 and IPV6 Classifier 403. If the packet is for a certain IP protocol, it increments the count for that IP protocol in that particular direction. If the count for a certain protocol in that direction reaches a preset threshold, the IP Protocol Meter 703 changes the state of that IP protocol to blocked state in that direction for a certain predetermined time period. Any packet containing that particular IP protocol is blocked for that time period.

Layer 3 Source Tracking Meter 704: This block receives data from IPV4 Classifier 402 and IPV6 Classifier 403. It increments the count for source IP address of the packet. If the count for that IP Address reaches a preset threshold, the Layer 3 Source Tracking Meter 704 changes the state of that source IP Address to blocked state for a certain predetermined time period.

In addition, to track culprit sources, this meter receives input from other Layer 3 flood meters. Whenever a packet arrives and it meets a blocked state criteria by these meters, they inform the Source Tracking Meter 704. The Source Tracking Meter 704 then increments the count for that particular Source IP Address by manifold. This makes that particular source reaching the threshold faster than non-culprit IP addresses, thereby enabling easy detection of culprit sources.

Layer 3 Destination Tracking Meter 704: To identify victim destination IP addresses, this meter increments count for a destination IP addresses each time a packet is received for the destination. The IP address information is received from the Layer 3 IPV4 and IPV6 Classifiers 402 and 403. If the count for that IP address reaches a preset threshold, the Layer 3 Destination Tracking Meter 704 changes the state of that destination IP Address to blocked state for a certain predetermined time period.

Figure 8:
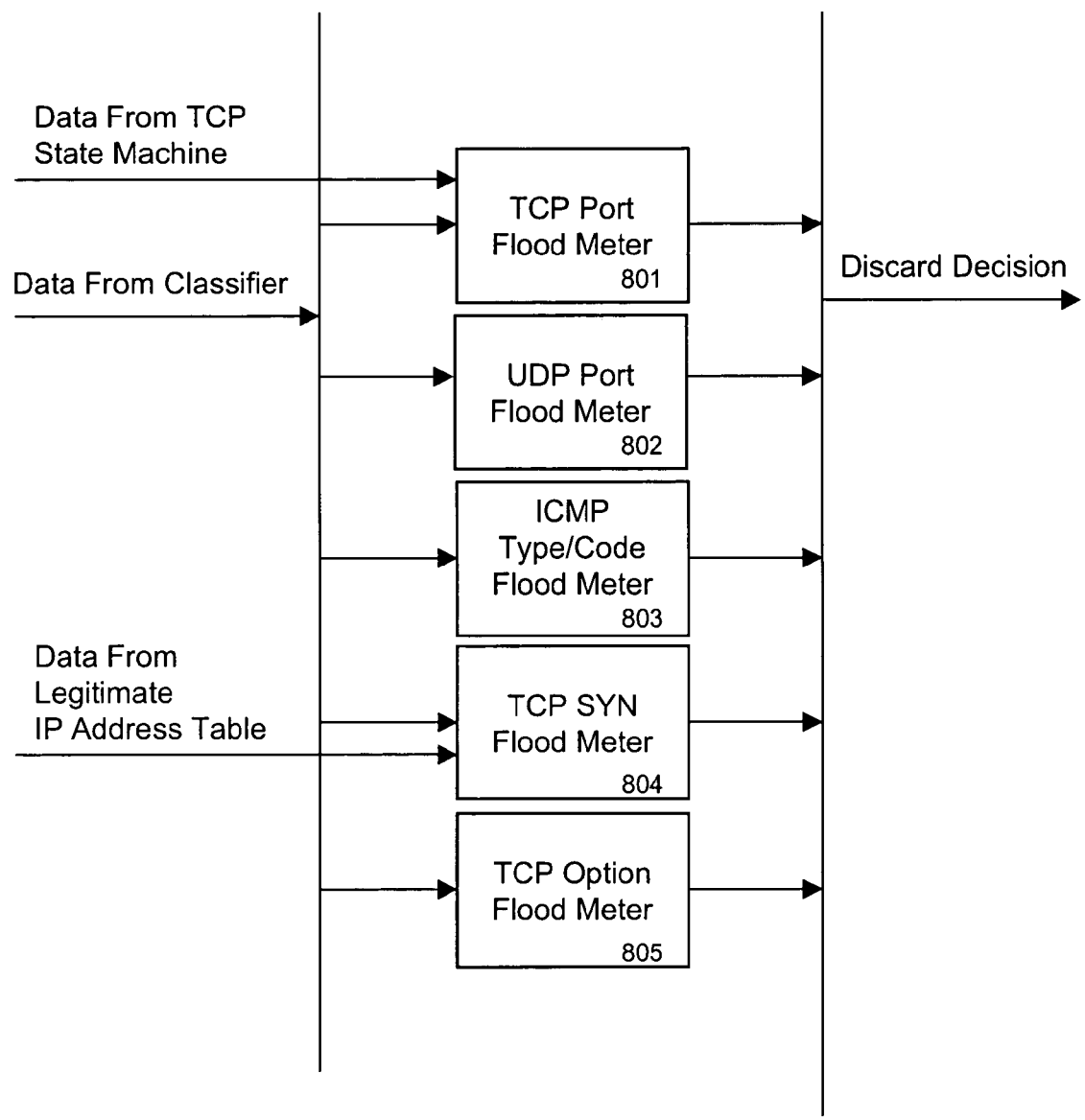
FIG. 8 shows an example of the Layer 4 Flood Meters of FIG. 5.

FIG. 8 depicts the details of the Layer 4 Flood Meters 503 of FIG. 5. The Layer 4 Flood Meters block 503 comprises meters to detect and prevent TCP Port Floods, UDP Port Floods, ICMP Floods, SYN Floods, and TCP Options Floods.

TCP Port Flood Meter 801: This block receives data from Layer 2 Classifier 401, Layer 3 Classifiers 402 and 403, Layer 4 TCP Classifier 404, and from TCP state machine 505. Layer 2 classifier 401 informs the TCP Port Flood Meter 801 whether the incoming packet is an IP packet. The IP Classifiers 402 and 403 inform the TCP Port Floods Meter 801 whether this is a TCP packet. The TCP Classifier 404 informs the TCP Port Flood Meter 801 of the start of the TCP header, while the TCP State Machine 505 informs the TCP Port Flood Meter 801 the direction of the packet with respect to the original connection. This helps the TCP Port Flood Meter 801 determine the destination port of the connection which may not be the same as that of the packet.

If the packet is an IP and a TCP packet, the TCP Port Flood Meter 801 increments the count for the destination port corresponding to the connection in that particular direction. If the count in that direction reaches a preset threshold, the TCP Port Flood Meter 801 changes the state of that destination port to blocked state in that direction for a certain predetermined time period. When a TCP packet arrives, if the state for that destination port is blocked in that direction, the packet is dropped.

Table 4 depicts an exemplary table storing the TCP Port Flood information. This table contains ($2^{16}-1$) rows corresponding to the possible TCP ports.

TABLE 4

TCP Port Flood Table

Port (Implicit Key)

| | |
|---|---|
| TCP Count Forward | Count of TCP packet in Forward Direction |
| TCP Threshold Forward | Threshold of TCP packets in Forward direction |
| TCP Forward Blocked State | Blocked State for TCP packets in Forward Direction |
| Forward Blocked Timeout | Timeout for blocked TCP packets in forward direction |
| TCP Count Reverse | Count of TCP packet in Reverse Direction |
| TCP Threshold Reverse | Threshold of TCP packets in Reverse direction |
| TCP Reverse Blocked State | Blocked State for TCP packets in Reverse Direction |
| TCP Reverse Blocked Timeout | Timeout for blocked TCP packets in reverse direction |

UDP Port Flood Meter 802: This block receives data from Layer 2 Classifier 401, Layer 3 Classifiers 402 and 403, and Layer 4 UDP Classifier 405. The Layer 2 classifier 401 informs the UDP Port Flood Meter 802 whether the incoming packet is an IP packet. The IP Classifiers 402 and 403 inform the UDP Port Flood Meter 802 whether this is a UDP packet. The UDP Classifier 405 informs the UDP Port Flood Meter 802 of the start of the UDP header.

If the packet is an IP and a UDP packet, the UDP Port Flood Meter 802 increments the count for the destination port corresponding to the packet in that particular direction. If the count in that direction reaches a preset threshold, the UDP Port Flood Meter 802 changes the state of that destination UDP port to blocked state in that direction for a certain predetermined time period.

Table 5 depicts an exemplary table storing the UDP Port Flood information. This table contains $(2^{16}-1)$ rows corresponding to the possible UDP ports.

TABLE 5

UDP Port Flood Table

Port (Implicit Key)

| | |
|---|---|
| UDP Count Forward | Count of UDP packet in Forward Direction |
| UDP Threshold Forward | Threshold of UDP packets in Forward direction |
| UDP Forward Blocked State | Blocked State for UDP packets in Forward Direction |
| UDP Forward Blocked Timeout | Timeout for blocked UDP packets in forward direction |
| UDP Count Reverse | Count of UDP packet in Reverse Direction |
| UDP Threshold Reverse | Threshold of UDP packets in Reverse direction |
| UDP Reverse Blocked State | Blocked State for UDP packets in Reverse Direction |
| UDP Reverse Blocked Timeout | Timeout for blocked UDP packets in reverse direction |

ICMP Type/Code Flood Meter 803: This block receives data from Layer 2 Classifier 401, Layer 3 Classifiers 402 and 403, and Layer 4 ICMP Classifiers 406 and 407. The Layer 2 classifier 401 informs the ICMP Type/Code Flood Meter 803 whether the incoming packet is an IP packet. The IP Classifiers 402 and 403 inform the ICMP Type/Code Flood Meter 803 whether this is an ICMP packet. The ICMP Classifiers 406 and 407 inform the ICMP Type/Code Flood Meter 803 of the start of the ICMP header.

If the packet is a IP and an ICMP packet, the ICMP Type/Code Flood Meter 803 increments the count for the ICMP Type and Code combination corresponding to the packet in that particular direction. If the count in that direction reaches a preset threshold, the ICMP Type/Code Flood Meter 803 changes the state of that type/code combination to blocked state in that direction for a certain predetermined time period.

Table 6 depicts an exemplary table storing the ICMP Type/Code Flood information. This table contains $(2^{16}-1)$ rows corresponding to the possible Type/Code combinations.

TABLE 6

ICMP Type/Code Flood Table

ICMP Type/Code Combination(Implicit Key)

| | |
|---|---|
| ICMP Count Forward | Count of ICMP packet in Forward Direction |
| ICMP Threshold Forward | Threshold of ICMP packets in Forward direction |
| ICMP Forward Blocked State | Blocked State for ICMP packets in Forward Direction |
| ICMP Forward Blocked Timeout | Timeout for blocked ICMP packets in forward direction |
| ICMP Count Reverse | Count of ICMP packet in Reverse Direction |
| ICMP Threshold Reverse | Threshold of ICMP packets in Reverse direction |
| ICMP Reverse Blocked State | Blocked State for ICMP packets in Reverse Direction |
| ICMP Reverse Blocked Timeout | Timeout for blocked ICMP packets in reverse direction |

TCP SYN Flood Meter 804: This block receives data from Layer 2 Classifier 401, Layer 3 Classifiers 402 and 403, Layer 4 TCP Classifier 404, and from Legitimate IP Address Table 506. The Layer 2 classifier 401 informs the TCP SYN Flood Meter 804 whether the incoming packet is an IP packet. The IP Classifiers 402 and 403 inform the TCP SYN Flood Meter 804 whether this is a TCP packet. The TCP Classifier 404 informs the TCP SYN Flood Meter 804 of the start of the TCP header and whether this is a TCP SYN packet.

If the packet is an IP packet and a TCP SYN packet, the TCP SYN Flood Meter 804 increments the count for such packets in that particular direction. If the count in that direction reaches a preset threshold, the TCP SYN Flood Meter 804 changes the state to SYN Flooded state in that direction for a certain predetermined time period.

During the SYN Flooded state, the Legitimate Address Table 506 described earlier determines which TCP SYN traffic is allowed. If the source of the TCP packet is found in the Table, it is allowed. Otherwise, it is not allowed.

TCP Option Flood Meter 805: This block receives data from Layer 2 Classifier 401, Layer 3 Classifiers 402 and 403, and Layer 4 TCP Classifier 404. The Layer 2 classifier 401 informs the TCP Option Flood Meter 805 whether the incoming packet is an IP packet. The IP Classifiers 402 and 403 inform the TCP Option Flood Meter 805 whether this is a TCP packet. The TCP Classifier 404 informs the TCP Option Flood Meter 805 of the start of the TCP header and of various TCP options in the packet.

If the packet is an IP packet and a TCP packet with options, the TCP Option Flood Meter 805 increments the count for the options in the packet in that particular direction. If the count for a certain TCP option in that direction reaches a preset threshold, the TCP Option Flood Meter 805 changes the state for that specific TCP option to blocked state in that direction for a certain predetermined time period.

Figure 9:
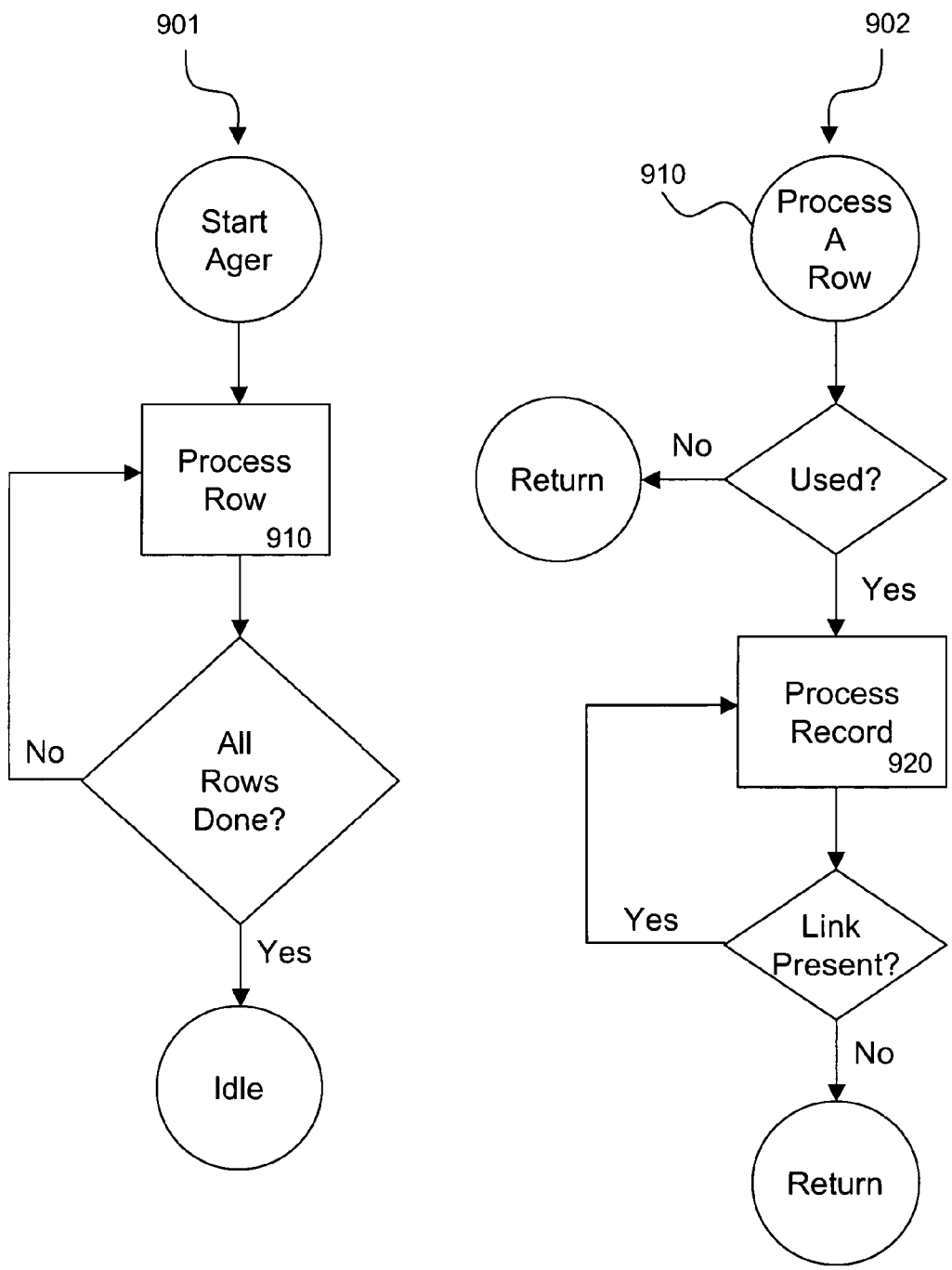
FIG. 9 shows the process of aging for single row, multiple row and hash based tables.

FIG. 9 depicts the details of the Ager 315 of FIG. 3. Ager 315 monitors periodically various tables mentioned above, e.g., Tables 1, 2 and 3, and their entries in external memory and decrements the timeout. When the timeout reaches 0, the entry is removed or the state is unblocked, depending on the table.

A software driver is necessary to manage the appropriate thresholds for various types of network nodes, e.g., traffic profile of a server differs from that of a workstation. Similarly, if a node is a web-server, its traffic profile, vis-à-vis traffic to ports, would be different from another server, say, an e-mail server.

An Ager exists for each meter and monitors the relevant tables, which include the following types:

Aggregate Tables—such as those utilized by the fragment flood meters. In a sense these tables have a single row only. Table 3 shows an exemplary aggregate table for fragment flood.

Fixed Size Tables—such as those utilized by TCP or UDP port flood meters. These tables have more than one row. For example, the TCP Flood Meter 801 has ($2^{16}$–1) rows. Table 4, Table 5, and Table 6 show examples of fixed size tables.

Hash Based Tables—such as those utilized by Layer 3 Source Tracking Meter 704. Since an index such as IPV4 address or IPV6 address will lead to a large index space, tables that need such indexes are implemented using a hashing scheme. These tables have a main entry followed by a possible link to provide for collision. Some of the main entries may be unused because hash index may have been unused. The number of main and link rows in these tables is decided by the designer of the system. Table 1 and Table 2 show examples of hash-based tables.

FIG. 9 illustrates in two flowcharts 901 and 902 how these tables are processed. For Aggregate tables, only one row is processed in step 910. For Fixed Sized Tables, multiple rows are processed. For Hash Based tables, both main as well as link rows are processed until all rows and all linked entries have been processed.

Figure 10:
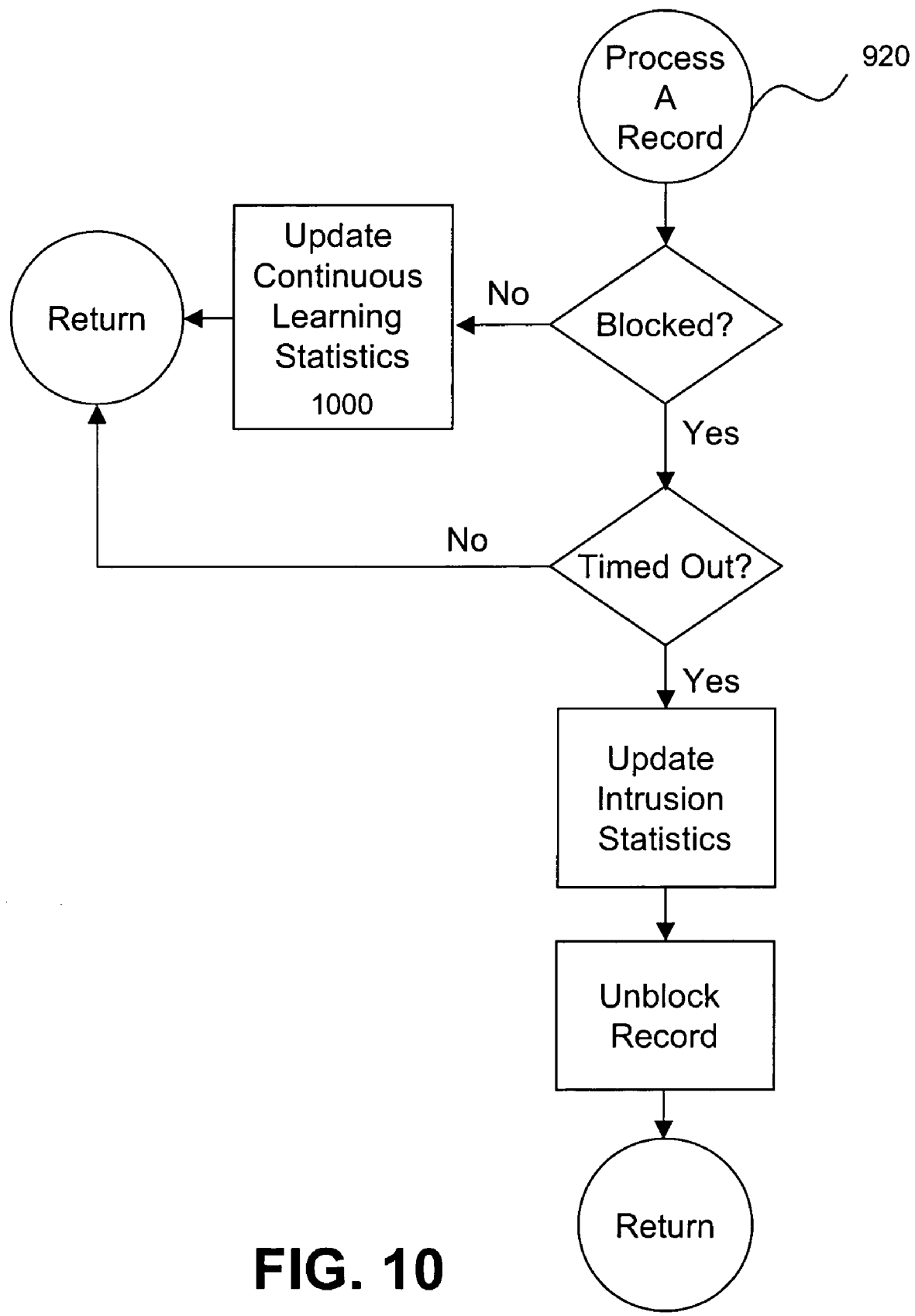
FIG. 10. shows the details of processing a record in the Aging process of FIG. 9.

FIG. 10 schematically shows how a record is processed in step 920. To process a record, the Ager 315 determines whether the record is blocked. If not, then the continuous learning statistics is updated. This is described later in greater details. If the record is blocked, the Ager 315 checks to see if the blocking period has timed out. If the timeout has not yet occurred, the Ager 315 simply returns from this record. If the record has already timed out, the intrusion statistics are updated and the record is unblocked. The host can read the intrusion statistics. This can be done using an interrupt mechanism.

Figure 11:
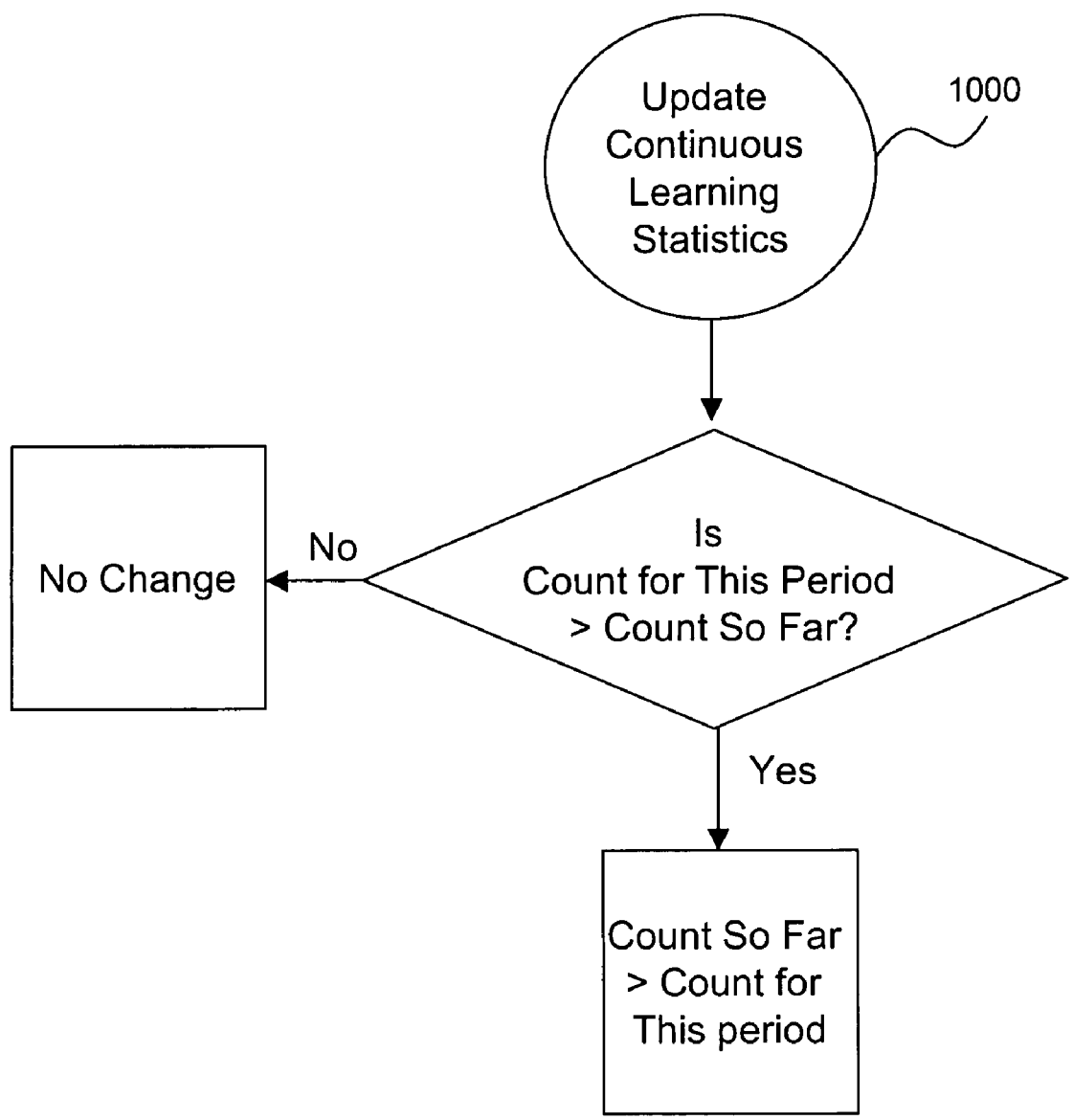
FIG. 11 depicts the process of updating the continuous learning statistics described in FIG. 10.

FIG. 11 depicts the process 1000 of updating the continuous learning statistics described in FIG. 10. A continuous learning mechanism is utilized to get a baseline for normal traffic during the period of no intrusion. The mechanism can be used to get continuous samples for a plurality of traffic characteristics such as port traffic, traffic using a certain IP option, traffic from a single source or to a single destination, etc. This is used to predict the threshold for traffic so that intrusions can be detected when the thresholds are reached/ crossed later.

A traffic counter is initialized to zero when a record is created. This holds the value for traffic so far. Another counter is created for an Ager period. This counter holds the traffic during the Ager period. This counter is incremented for every packet that meets the traffic criterion. During the Ager cycle, the counter for this period is compared against the counter so far, if the counter for this period is greater than the counter so far, the counter so far is replaced with the counter for this period. The counter so far is used to predict the threshold.

Figure 12:
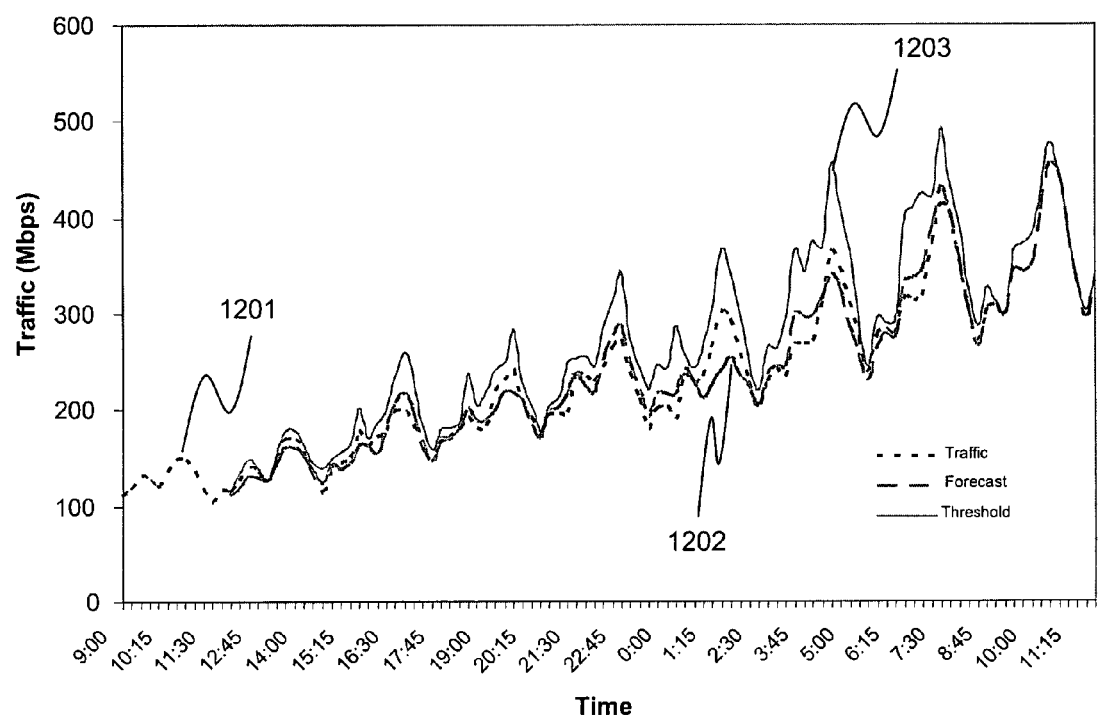
FIG. 12 depicts a graph that shows the traffic, forecasted traffic and the estimated threshold of traffic to detect and prevent the traffic from getting intruded.

FIG. 12 depicts a chart which graphically shows the technique for threshold estimation. The dotted line 1201 shows traffic samples taken using continuous learning process described in FIG. 11. These samples are used to forecast the traffic in a future time using past samples. This is shown using the dashed lines 1202. Holt Winter's technique of forecasting based on base, trend, and seasonality is used to forecast the traffic in a future time. The deviation of traffic from the forecasted traffic is used to predict the threshold. This is again done utilizing the Holt Winter's technique. This is shown using the continuous line 1203. Following sections describe the method in greater detail.

Traffic forecasting gauges what will be traffic at a future point based on past traffic. This requires that we take care of average traffic in the past, its trend, and its seasonal variability. For example, if there is a gradual increase in traffic due to increase in subscribers, it must be taken into consideration. Seasonal trend or cycle involves determining whether the traffic peaks and troughs during hourly, daily or weekly basis. With these factors in calculation, Holt Winter's method allows forecasting using the formulas described below.

Traffic Forecasting Using Exponential Smoothing:

To forecast the traffic with exponential smoothing, $$F_t = aD_t + (1-a)F_{t-1}$$

where $F_t$ is the forecasted traffic at time t, $D_t$ is the traffic at time t, $F_{t-1}$ is the forecast at time t−1, and a is the smoothing coefficient for the base traffic. Thus, the new forecast is the weighted sum of the old forecasts and actual traffic. With this scheme, the traffic can be exponentially smoothed and a forecast can be calculated.

Traffic Forecasting with Exponential Smoothing Using Base and Trend:

To de-trend the traffic by separating the base from the trend effects, trend forecasts can be similarly smoothed.

To smooth the base forecast $B_t$, the base is smoothed in a manner described above, in which $$B_t = \alpha D_t + (1-\alpha)(B_{t-1} + T_{t-1}).$$

To smooth the trend forecast $T_t$, $$T_t = \beta(B_t - B_{t-1}) + (1-\beta)T_{t-1}$$

where β is the smoothing coefficient for trend forecasts.

The forecast for k periods into future $F_{t+k}$ can then be derived using the base forecast and the trend forecast:

$$F_{t+k} = B_t + kT_t$$

With the above scheme, the traffic's base and trend are exponentially smoothed and a forecast calculated.

Traffic Forecasting Based on Base, Trend and Seasonality:

To de-trend as well as de-seasonalize the traffic, seasonality forecast can be similarly smoothed.

To smooth the base forecast now, apply $$B_t = \alpha(D_t - S_{t-m}) + (1-\alpha)(B_{t-1} + T_{t-1})$$

where $S_t$ is the seasonality forecast at time t.

To smooth the trend forecast $T_t$, $$T_t = \beta(B_t - B_{t-1}) + (1-\beta)T_{t-1}.$$

To smooth the seasonality forecast $S_t$, use $$S_t = \gamma(D_t - B_t) + (1-\gamma)S_{t-m}$$

where $\gamma$ is the smoothing coefficient for seasonality forecasts and m is the seasonality period (e.g. 1 hour, 1 day or 1 week).

The forecast for k periods into future $F_{t+k}$ can then be obtained using the base forecast, the trend forecast and seasonality forecast:

$$F_{t+k} = (B_{t-1} + kT_{t-1} + S_{t+k-m}).$$

Traffic Threshold Estimation Using Deviation Smoothing:

Since actual traffic will deviate from the forecast, smoothed deviation can be used to predict a threshold of traffic that can be considered normal allowable traffic.

Thus, if $E_t$ is the predicted deviation at time t, it can be smoothed with $$E_t = \gamma|D_t - F_t| + (1-\gamma)E_{t-m}$$

where $\gamma$ is the smoothing coefficient for deviation and m is the seasonality period.

Beyond the threshold, the traffic can be considered intrusive because it exceeds the estimated forecast and an allowable deviation. Given that we know the traffic forecast and the deviation forecast, we can now predict the threshold to be used for intrusion, $$F_t + \delta \cdot E_t$$

where $\delta$ is a scaling factor used for threshold estimation.

Although the present invention and its advantages have been described in detail, it should be understood that the present invention is not limited to or defined by what is shown or discussed herein. For example, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

I claim:

1. A digital computing apparatus capable of detecting and preventing a plurality of rate based and non rate based denial of service attacks, said apparatus comprising:

a media access controller (MAC) interface connected to an unprotected side of a network and to a protected side of the network;

a classification means operatively coupled to said MAC interface for classifying data packets received from the unprotected side of the network through said MAC interface according to Layer 2, Layer 3, and Layer 4 classifications, said classification means being capable of enforcing Layer 2, Layer 3, and Layer 4 accepted header syntax, wherein the classifying comprises isolating header values and performing hierarchical protocol classification;

a meter means operatively coupled to said classification means, said meter means having a plurality of meters and being capable of maintaining statistics of said attacks and determining whether a threshold has been reached;

a decision multiplexer means operatively coupled to said meter means, said decision multiplexer means being capable of accepting decisions from said plurality of meters and informing a single decision to said MAC interface;

an ager means capable of timing out flood states identified by said classification means or by said meter means, said ager means comprising a continuous learning mechanism for continuously learning and updating said statistics;

a source tracking mechanism multiplicatively incrementing count for sources that send identified flood data, thereby distinguishing said sources from others that send non-flood data;

a SYN flood detection and prevention mechanism having a support means for creating a plurality of legitimate IP addresses during normal operation when a TCP state of TCP connections through the MAC interface transitions to ESTABLISHED, wherein said SYN flood detection and prevention mechanism allows only said plurality of legitimate IP addresses to be stored during normal operation, wherein the TCP state of the TCP connections is maintained by a TCP state machine in the apparatus; and a zombie flood detection and prevention mechanism having a means for limiting connections from the MAC interface to said plurality of legitimate IP addresses stored during normal operation; and a means for determining a threshold for said connections based on baseline traffic learned during normal operation;

wherein said support means for creating said plurality of legitimate IP addresses adds an IP address to said plurality of legitimate IP addresses when the TCP state of the TCP connections through the MAC interface transitions to "established" for the first time;

wherein said plurality of legitimate IP addresses comprises IP addresses which have established valid TCP connections through the MAC interface.

2. The apparatus of claim 1, wherein said plurality of meters detect and prevent rate based denial of service attacks selected from the group consisting of synchronization (SYN) flood, Transmission Control Protocol (TCP) flood, Internet Control and Message Protocol (ICMP) flood, User Datagram Protocol (UDP) flood, port scan, source flood, destination flood, broadcast flood, Address Resolution Protocol (ARP) flood, Reverse ARP (RARP) flood, multicast flood, Virtual Local Area Network (VLAN) flood, double encapsulated VLAN flood, protocol flood, Internet Protocol (IP) option flood, fragment flood, port flood, Layer 2 floods, Layer 3 floods, and Layer 4 floods.

3. The apparatus of claim 2, wherein said rate based denial of service attacks are to an end node or from said end node to other nodes on the internet.

4. The apparatus of claim 1, wherein said ager means monitors said statistics maintained by said plurality of meters.

5. The apparatus of claim 4, wherein said plurality of meters identify whether a threshold of counts has been reached for a flood state corresponding to a packet header value.

6. The apparatus of claim 5, wherein said plurality of meters inform said decision multiplexer means to block traffic with said packet header value.

7. A computer-implemented method for rate-based denial of service attack detection implemented at an apparatus positioned between a protected side of a network and an unprotected side of the network, the method comprising:

receiving packets from the unprotected side of the network;

classifying the received packets according to network layer 2, 3, 4 classification, wherein the classifying comprises isolating header values and performing hierarchical protocol classification;

metering the classification to produce statistics related to multiple types of attacks;

creating and storing a table of legitimate IP addresses during normal operation when a TCP state of TCP connections through the apparatus transitions to "established";

detecting a SYN flood state;

dropping at the apparatus packets from IP addresses not in the table of legitimate IP addresses during the detected SYN flood state;

detecting a zombie flood state when a number of packets received at the apparatus from legitimate IP addresses exceeds a threshold; and dropping at the apparatus packets from IP addresses in the table of legitimate IP addresses during the detected zombie flood state;

wherein creating and storing the table of legitimate IP addresses comprises:

adding an IP address to the table of legitimate IP addresses when the TCP state of TCP connections through the apparatus transitions to "established" for the first time; and maintaining in the table of legitimate IP addresses a list of IP addresses which have established valid TCP connections through the apparatus.

* * * * *